United States Patent
Sakayama

(10) Patent No.: US 10,182,173 B2
(45) Date of Patent: Jan. 15, 2019

(54) INFORMATION PROCESSING APPARATUS, INFORMATION PROCESSING METHOD, AND NON-TRANSITORY COMPUTER READABLE STORAGE MEDIUM

(71) Applicant: FUJI XEROX CO., LTD., Tokyo (JP)

(72) Inventor: Takashi Sakayama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/723,932

(22) Filed: Oct. 3, 2017

(65) Prior Publication Data

US 2018/0288273 A1 Oct. 4, 2018

(30) Foreign Application Priority Data

Mar. 28, 2017 (JP) ................. 2017-063575

(51) Int. Cl.
  *G06F 3/12* (2006.01)
  *H04N 1/327* (2006.01)
  *H04B 1/401* (2015.01)
  *H04N 1/00* (2006.01)
  *G06K 15/00* (2006.01)
  *H04W 72/04* (2009.01)

(52) U.S. Cl.
  CPC ......... *H04N 1/32793* (2013.01); *H04B 1/401* (2013.01); *H04N 1/0092* (2013.01); *H04N 1/00307* (2013.01); *H04N 1/00315* (2013.01); *H04N 1/32776* (2013.01); *H04N 1/32797* (2013.01); *H04N 2201/002* (2013.01); *H04N 2201/0027* (2013.01); *H04N 2201/0055* (2013.01); *H04N 2201/0094* (2013.01); *H04W 72/048* (2013.01)

(58) Field of Classification Search
  None
  See application file for complete search history.

(56) References Cited

U.S. PATENT DOCUMENTS

| 6,393,031 B1 | 5/2002 | Isomura |
| 2009/0111510 A1 | 4/2009 | Ono |
| 2015/0116768 A1* | 4/2015 | Kitao ............... G06F 3/1236 358/1.15 |

FOREIGN PATENT DOCUMENTS

| JP | H11-252662 A | 9/1999 |
| JP | 2009-303107 A | 12/2009 |
| JP | 4716144 B2 | 7/2011 |

* cited by examiner

*Primary Examiner* — Dov Popovici
(74) *Attorney, Agent, or Firm* — Oliff PLC

(57) ABSTRACT

An information processing apparatus includes plural communication units, a switching unit, and a controller. The communication units are configured to conduct a wireless communication. The switching unit is configured to switch a first communication unit having a relatively fast communication speed to a second communication unit having a relatively slow communication speed if a communication is attempted to start and if the first communication unit is being used. The controller is configured to perform a control to start the communication by the first communication unit.

7 Claims, 11 Drawing Sheets

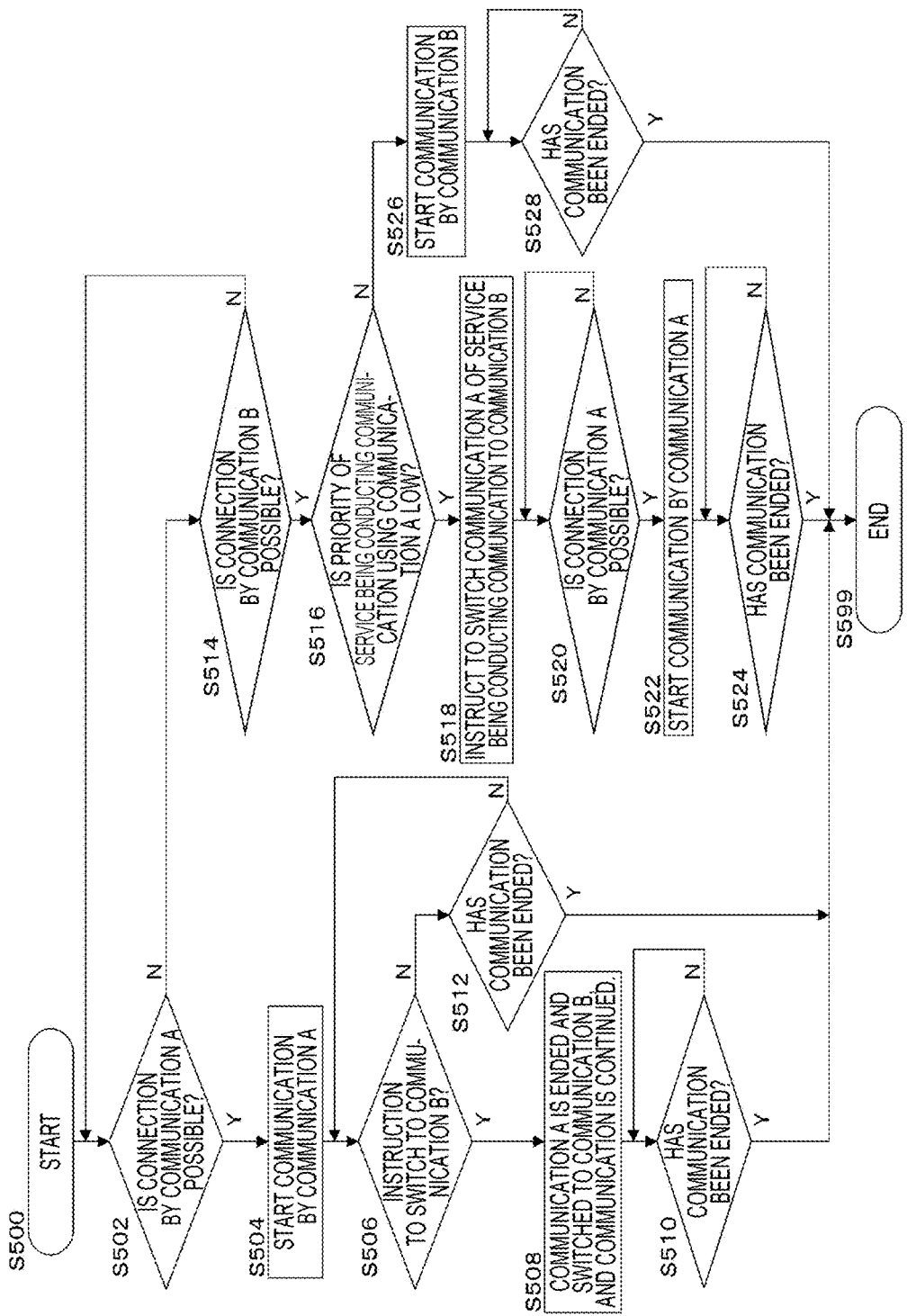

INFORMATION PROCESSING APPARATUS, INFORMATION PROCESSING METHOD, AND NON-TRANSITORY COMPUTER READABLE STORAGE MEDIUM

CROSS-REFERENCE TO RELATED APPLICATIONS

This application is based on and claims priority under 35 USC 119 from Japanese Patent Application No. 2017-063575 filed Mar. 28, 2017.

BACKGROUND

Technical Field

The present invention relates to an information processing apparatus, an information processing method, and a non-transitory computer readable storage medium.

SUMMARY

According to an aspect of the invention, an information processing apparatus includes plural communication units, a switching unit, and a controller. The communication units are configured to conduct a wireless communication. The switching unit is configured to switch a first communication unit having a relatively fast communication speed to a second communication unit having a relatively slow communication speed if a communication is being attempted to be started and if the first communication unit is being used. The controller is configured to perform a control to start the communication by the first communication unit.

BRIEF DESCRIPTION OF THE DRAWINGS

Exemplary embodiments of the present invention will be described in detail based on the following figures, wherein:

FIG. 5 is a flowchart illustrating an exemplary process by the exemplary embodiment;

DETAILED DESCRIPTION

First, prior to describing the present exemplary embodiment, premises of the present exemplary embodiment or an information processing apparatus using the present exemplary embodiment will be described. It should be noted that the descriptions are intended to facilitate understandings of the present exemplary embodiment.

In the related art, a smart phone or the like is equipped with multiple different communication units and selects a communication unit to be connected based on a specific priority or the like to conduct a communication.

In the technologies described in Japanese Patent No. 4716144 (corresponding to US 2009/0111510 A1), JP-A-11-252662 (corresponding to U.S. Pat. No. 6,393,031), and JP-A-2009-303107, when a communication is conducted (or prior to starting a communication), an optimum communication unit is selected and then the communication is conducted.

However, while one of the multiple communication units is selected and then the communication is conducted, the overall optimization may not be achieved due to later circumferences of the other communication units. For example, after a communication by a communication unit having a fast communication speed is started in response to a service request from a certain communication device, a service request requiring a faster communication speed may be received from another communication device. Even in this case, a communication unit having a relatively slow communication speed is used. As a result, it tends to take a time as a whole.

In this case, the present exemplary embodiment provides a technology in which, by switching the communication unit used in an earlier communication that has been being already conducted, a communication unit is selected from the overall optimization view and a communication is conducted.

Hereinafter, an exemplary embodiment suitable for implementing the present invention will be described with reference to the accompanying drawings.

Figure 1:
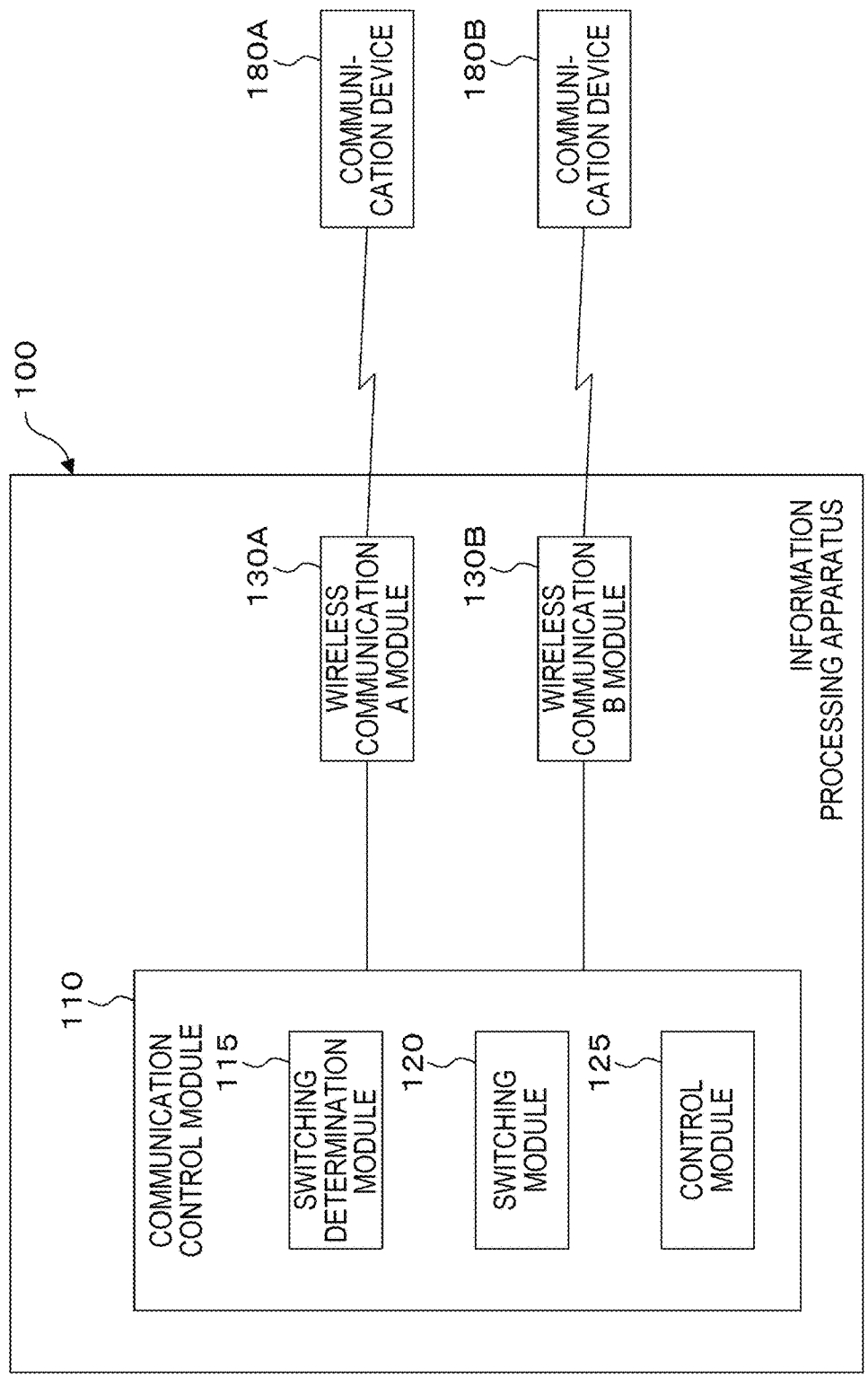
FIG. 1 is a view illustrating a conceptual module configuration relating to an exemplary configuration of an exemplary embodiment.

FIG. 1 is a view illustrating a conceptual module configuration relating to an exemplary configuration of the present exemplary embodiment.

A module, in general, indicates a logically separable component such as software (computer program) or hardware. Accordingly, a module in the present exemplary embodiment indicates not only a module in a computer program but also a module in a hardware configuration. Thus, the descriptions of the present exemplary embodiment also include descriptions of a computer program to serve as a module (a program that causes a computer to execute respective processes, a program that causes a computer to serve as respective units, and a program that causes a computer to implement respective functions), a system, and a method. For convenience of descriptions, the expressions "store," "caused to store," and equivalent expressions thereto will be used. If an exemplary embodiment is directed to a computer program, the expressions indicate storing data or the like in a memory device or performing a control to cause data or the like to be stored in a memory device. In addition, one module may correspond to one function. In implementation, however, one module may be configured with one program, multiple modules may be configured with one program, and in reverse, one module may be configured with multiple programs. Further, multiple modules may be executed by one computer, or one module may be executed by multiple computers in a distributed or parallel environment. In addition, one module may include another module. Hereinafter, the term "connection" is also used for a logical connection (for example, data exchange, instructions, and a reference relationship among data), in addition to a physical connection. The term "predetermined" refers to being determined prior to a target process. The term "predetermined" includes the meaning of being determined according to a circumstance/state at or until a specific time point not only before a process by the present exemplary embodiment is started, but also prior to a target process even after a process by the present exemplary embodiment is started. If multiple "predetermined values" exist, the values may be different from each other, or two or more of the values (or all values, of course) may be identical to each other. In addition, the description "when it is A, B is performed" indicates that "it is determined whether it is A, and if it is determined that it is A, B is performed," except for a case where it is unnecessary to make the determination as to whether it is A. If items are enumerated like "A, B, and C," the enumeration is merely exemplary and includes a case of selecting only one (for example, only A) of the items, unless otherwise specified.

In addition, a system or device includes a system or device which is implemented with one computer, hardware component, device or the like, in addition to a system or device configured such that multiple computers, hardware components, devices and the like are connected to each other by a communication unit such as a network (including a one-to-one corresponding communication connection). The terms "device" and "system" are synonymous with each other. Of course, the "system" does not include a system merely meaning a social "structure" (social system) which is an artificial engagement.

In addition, target information is read from a memory device per process by each module or for each of multiple processes which are executed in a module. After the process is executed, the process result is stored in the memory device. Accordingly, descriptions of reading from the memory device prior to the process and storing in the memory device after the process may be omitted. Examples of the memory device may include a hard disk, a random access memory (RAM), an external memory medium, a memory device through a communication line, a register within a central processing unit (CPU), and the like.

An information processing apparatus 100 of the present exemplary embodiment conducts a wireless communication with a communication device 180. The information processing apparatus 100 includes a communication control module 110, a wireless communication A module 130A, and a wireless communication B module 130B as illustrated in the example of FIG. 1. The number of the wireless communication modules 130 may be three or more.

A communication device 180A is connected to the wireless communication A module 130A of the information processing apparatus 100 via a communication line. The communication device 180A is capable of conducting a wireless communication with the wireless communication A module 130A by a certain transmission method and channel.

A communication device 180B is connected to the wireless communication B module 130B of the information processing apparatus 100 via a communication line. The communication device 180B is capable of conducting a wireless communication with the wireless communication B module 130B by a certain transmission method and channel.

The communication device 180 is, for example, a portable information communication device (including a mobile phone, a smart phone, a mobile device, a wearable computer, and the like), a laptop PC or an access point. There may be provided multiple communication devices 180 that are capable of conducting a wireless communication with the information processing apparatus 100.

Each communication device 180 may conduct a wireless communication by multiple transmission methods and multiple channels.

The communication device 180 requests the information processing apparatus 100 to provide a service, through the wireless communication. Here, the "service" refers to a function or an operation provided by conducting the communication and is also called a job. For example, examples of the service include a printing process service for making a printing instruction and an image reading service for receiving an image reading result, with respect to an image processing apparatus 200 including the information processing apparatus 100.

The wireless communication A module 130A is connected to the communication control module 110 and also connected to the communication device 180A via the communication line. The wireless communication A module 130A is capable of conducting the wireless communication with the communication device 180A by the certain transmission method and channel. For example, the communication speed of the wireless communication A module 130A is different from the communication speed of the wireless communication B module 130B. In the following descriptions, for example, it is assumed that the communication speed of the wireless communication A module 130A is faster than the communication speed of the wireless communication B module 130B.

The wireless communication B module 130B is connected to the communication control module 110 and also connected to the communication device 180B via the communication line. The wireless communication B module 130B is capable of conducting the wireless communication with the communication device 180B by the certain transmission method and channel. For example, the communication speed of the wireless communication B module 130B is different from the communication speed of the wireless communication A module 130A. In the following descriptions, for example, it is assumed that the communication speed of the wireless communication B module 130B is slower than the communication speed of the wireless communication A module 130A.

In addition, each wireless communication module 130 may be capable of conducting a wireless communication by multiple transmission methods and multiple channels. The multiple transmission methods may include, for example, IEEE802.11a, IEEE802.11b, IEEE802.11c, IEEE802.11g, IEEE802.11n, IEEE802.11ac, IEEE802.11j, IEEE802.11ad, and Bluetooth (registered trademark).

In addition, at least one of the transmission methods of the wireless communication module 130 may have multiple channels (wireless communication paths). Of course, each of all the transmission methods may have multiple channels.

In addition, the transmission methods by which the wireless communication module 130 is capable of conducting a wireless communication may include at least IEEE802.11ad.

The communication control module 110 includes a switching determination module 115, a switching module 120, and a control module 125. The communication control module 110 is connected to the wireless communication A module 130A and the wireless communication B module 130B. The communication control module 110 controls the wireless communication between the information processing apparatus 100 and the communication device 180.

If a communication Y is attempted to be started and if a communication X has been being conducted, the switching determination module 115 determines whether to use the wireless communication module 130 (either of the wireless communication A module 130A or the wireless communication B module 130B) that is being used in the communication X, for the communication Y. It is assumed that the communications X and Y are wireless communications having different communication speeds. Specifically, the communications X and Y have different transmission methods or channels.

For example, the switching determination module 115 may determine whether to switch the wireless communication module 130, by comparing the priority (including the "priority level") of a service A that is conducting the communication with the priority of a service B that is attempting to start the communication Y. Here, "switch the wireless communication module 130 (switching of the wireless communication module 130)" refers to switching the wireless communication A module 130A (the communication speed of the wireless communication A module 130A is faster than that of the wireless communication B module 130B) that is being used in the communication X, to the wireless communication B module 130B (the communication speed of the wireless communication B module 130B is slower than that of the wireless communication A module 130A) or changing the number of channels. With this configuration, the wireless communication A module 130A may be used for the communication Y.

Specifically, if the priority of the service B that is attempting to start the communication Y is higher than the priority of the service A that is conducting the communication, the switching determination module 115 may determine to perform the switching. In addition, the priority of the printing process service may be set to be higher than the priority of the image reading service.

In addition, for example, the switching determination module 115 may determine whether to perform the switching, by comparing a remaining data amount or remaining communication time of the service A that is conducting the communication X with a data amount or communication time of the service B that is attempting to start the communication Y.

If the communication Y is attempted to be started and if the wireless communication A module 130A having the communication speed faster than that of the wireless communication B module 130B has already been being used in the communication X, the switching module 120 switches the wireless communication A module 130A that is being used in the communication X to the wireless communication B module 130B having the relatively slow communication speed. Specifically, this example corresponds to a case where the communication X has already been being conducted with the communication device 180A using the wireless communication A module 130A (prior to the start of the communication Y), and during this communication, a communication request is made from the communication device 180B. In this case, the communication X with the communication device 180A is switched from the wireless communication A module 130A to the wireless communication B module 130B. As a result of the switching, the communication X with the communication device 180A is conducted by the wireless communication B module 130B.

Then, the control module 125 performs a control to start the communication Y by the wireless communication A module 130A. That is, the communication Y with the communication device 180B is conducted by the wireless communication A module 130A.

In addition, the switching module 120 may switch the communication, by comparing the priority of the service A that is conducting the communication X with the priority of the service B that is attempting to start the communication Y.

Here, the priority of the printing process service may be set to be higher than that of the image reading service. In this case, if the priority of the service B that is attempting to start the communication is higher than the priority of the service A that is conducting the communication, the switching module 120 may switch the communication.

In addition, the switching module 120 may switch the communication, by comparing a remaining data amount or remaining communication time of the service A that is conducting the communication with a data amount or communication time of the service B that is attempting to start the communication.

In addition, if the service A that is conducting the communication uses multiple channels, the switching module 120 may perform the switching of the communication by reducing the number of channels that the service A being conducting the communication uses and allocating the reduced channels to the service B that is attempting to start a communication. The channels will be described later using the example of FIGS. 4A and 4B.

Figure 2:
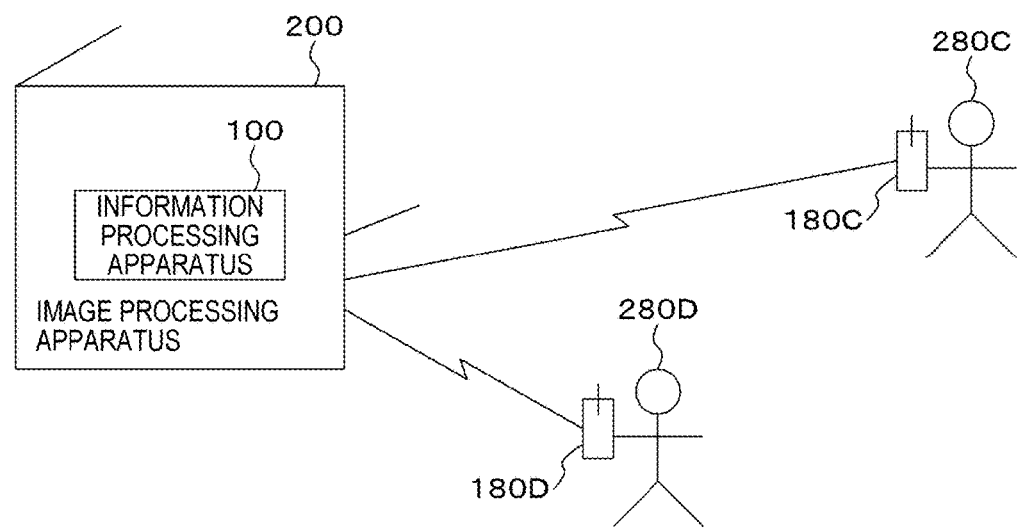
FIG. 2 is an explanatory view illustrating an exemplary system configuration using the exemplary embodiment.

FIG. 2 is an explanatory view illustrating an exemplary system configuration using the present exemplary embodiment.

The image processing apparatus 200 includes the information processing apparatus 100. The image processing apparatus 200, a communication device 180C of a user 280C, and a communication device 180D of a user 280D are connected to each other via communication lines. Especially, the image processing apparatus 200 is machine that is installed in an office or the like and used by multiple users. The image processing apparatus 200 may be used through the multiple communication devices 180 simultaneously. The image processing apparatus 200 is, for example, a copier, a facsimile, a scanner, a printer, or a multifunctional machine (an image processing apparatus having two or more functions of a scanner, a printer, a copier, a facsimile, and the like).

In the image processing apparatus 200, an optimum communication unit is selected from multiple communication units. Even if the selected communication unit is being used in another service (job), the communication unit being conducting the communication is switched so that the communication may be conducted by the optimum communication unit.

As a specific example, the user 280C is attempting to perform a scanning operation with the image processing apparatus 200 to perform a process of transmitting a scanned image to the communication device 180C and storing the received image in the communication device 180C (the image reading service). Then, the user 280D is attempting to operate the communication device 180D to perform a process of transmitting a printing instruction to the image processing apparatus 200 and causing the image processing apparatus 200 to acquire a printed matter (the printing process service). If a wireless communication has already been being conducted with the communication device 180C by the transmission method of IEEE802.11ad, in order to conduct a communication with the communication device 180D, the wireless communication with the communication device 180C is switched to the wireless communication by the transmission method of IEEE208.11n through the above-described switching, and a wireless communication is conducted with the communication device 180D by the transmission method of IEEE802.11ad.

Figure 3:
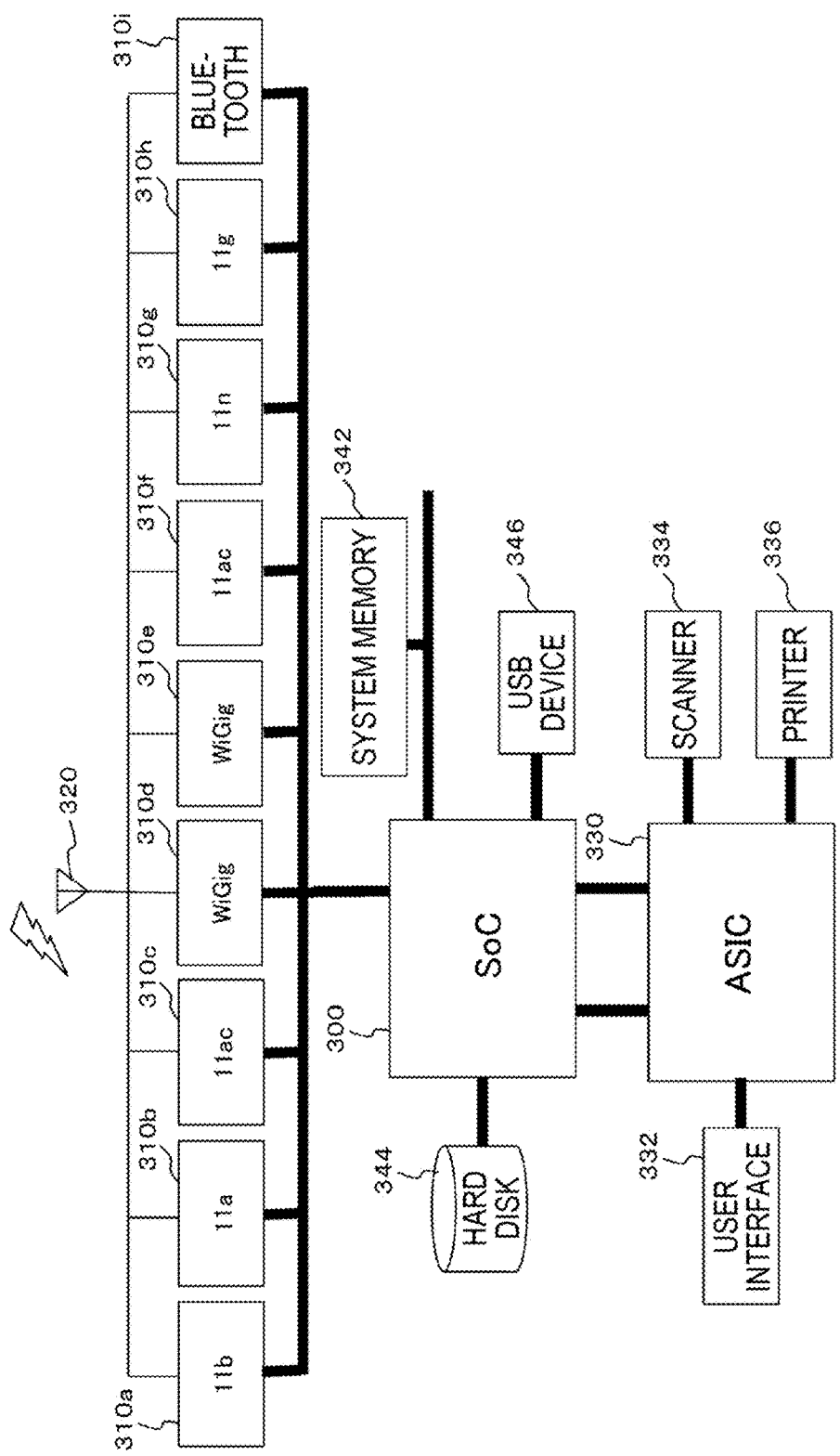
FIG. 3 is an explanatory view illustrating a specific exemplary configuration of the exemplary embodiment.

FIG. 3 is an explanatory view illustrating a specific exemplary configuration of the present exemplary embodiment (the image processing apparatus 200). The image processing apparatus 200 includes a system on a chip (SoC) 300, 11b:310a, 11a:310b, 11ac:310c, WiGig:310d, WiGig: 310e, 11ac:310f, 11n:310g, 11g:310h, Bluetooth 310i, an antenna 320, a system memory 342, a hard disk 344, a USB device 346, an application specific integrated circuit (ASIC) 330, a user interface 332, a scanner 334, and a printer 336. These communication devices (communication chips) 310 correspond to the multiple wireless communication modules 130.

11b:310a is connected to the antenna 320 and the SoC 300. 11a:310b is connected to the antenna 320 and the SoC 300. 11ac:310c is connected to the antenna 320 and the SoC 300. WiGig:310d is connected to the antenna 320 and the SoC 300. WiGig:310e is connected to the antenna 320 and the SoC 300. 11ac:310f is connected to the antenna 320 and the SoC 300. 11n:310g is connected to the antenna 320 and the SoC 300. 11g:310h is connected to the antenna 320 and the SoC 300. Bluetooth 310i is connected to the antenna 320 and the SoC 300. The antenna 320 may be shared. Further, multiple antennas 320 may be provided. The combinations of the communication devices (communication chips) 310 and the antenna 320 are an example implementing the wireless communication modules 130 illustrated in the example of FIG. 1. 11b:310a to 11g:310h comply with the "IEEE 802.11 standard" which is the international standard of the wireless communication standard and includes "a," "a/b," "b/g," "a/b/g/n," and the like. Of course, Wireless Fidelity (Wi-Fi) which is a product complying with the above-described standard may be used. Especially, IEEE802.11ad which is a wireless communication standard of the 60 GHz band may be adopted. That is, WiGig (Wireless Gigabit) which is a product complying with IEEE802.11ad may be used. As the transmission method of the wireless communication, transmission methods such as Bluetooth 310i other than the "IEEE802.11 standard" may be used.

The SoC 300 is connected to 11b:310a, 11a:310b, 11ac: 310c, WiGig:310d, WiGig:310e, 11ac:310f, 11n:310g, 11g: 310h, Bluetooth 310i, the system memory 342, the hard disk 344, the USB device 346, and the ASIC 330. The SoC 300 is an example implementing the communication control module 110. The SoC 300 mainly controls the communication devices (communication chips) 310, the system memory 342, the hard disk 344, and the USB device 346.

The system memory 342 is connected to the SoC 300. The system memory 342 is, for example, a memory used for executing programs of the communication control module 110.

The hard disk 344 is connected to the SoC 300. In the hard disk 344, for example, communication contents are stored.

The USB device 346 is connected to the SoC 300. The USB device 346 reads from and writes into, for example, an external connection device such as a removable storage medium and an IC card. In addition, another communication device may be connected.

The ASIC 330 is connected to the SoC 300, the user interface 332, the scanner 334, and the printer 336. The ASIC 330 controls the scanner 334, the printer 336, the user interface 332 and the like to implement the main functions of the image processing apparatus 200.

The user interface 332 is connected to the ASIC 330. The user interface 332 receives an operation by a user and presents a message or the like to the user by controlling, for example, a liquid crystal display also serving as a touch panel. In addition, the user interface 332 may receive the user's operation (including gaze, gesture, voice, and the like) using a mouse, a keyboard, a camera, a microphone or the like, and may present a message to the user by voice output from a loudspeaker or touch sense using a touching device.

The scanner 334 is connected to the ASIC 330. The scanner 334 reads an image of an original document and transmits the image.

The printer 336 is connected to the ASIC 330. The printer 336 performs printing according to a printing instruction received by the communication devices (communication chips) 310 or the user interface 332.

Figure 4A:
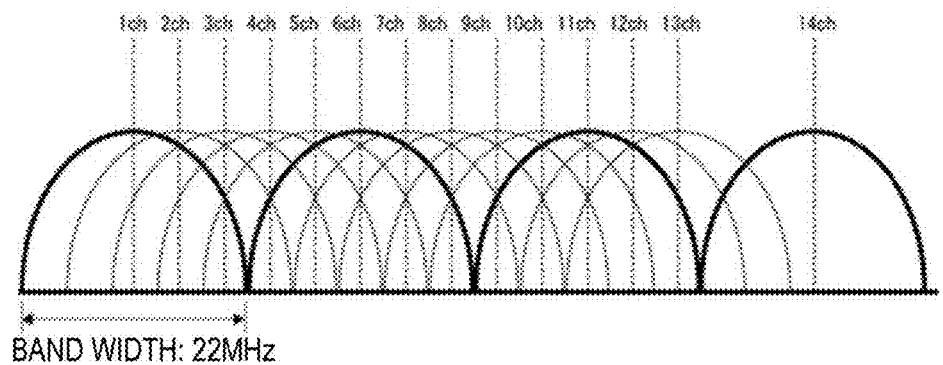
FIGS. 4A and 4B are explanatory views illustrating examples of channels.
Figure 4B:
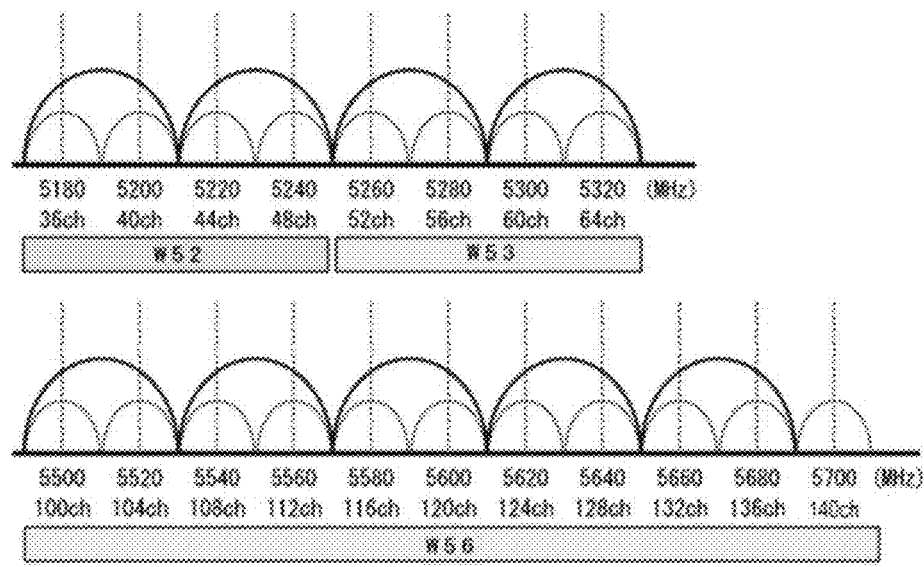

FIGS. 4A and 4B are explanatory diagrams illustrating examples of channels.

For example, descriptions will be made on channels in the "2.4 GHz band" and the "5 GHz band" of the "IEEE 802.11 standard."

The wireless standard using the "2.4 GHz band" is easily affected by other devices and is difficult to conduct a stable communication. For example, if a microwave oven or another identical wireless LAN device exists nearby, the communication often becomes unstable. Meanwhile, compared to the "5 GHz band," radio waves reach far away and are less affected by an obstacle or the like. Further, the "2.4 GHz band" is used by many devices and highly compatible.

Since the "5 GHz band" is used by a small number of devices, the "5 GHz band" is less affected by a microwave oven and the like and may be expected to conduct a stable communication. Meanwhile, when a blocking object exists, the "5 GHz band" is easily affected by the blocking object, as compared to the "2.4 GHz band," and may not conduct a stable communication as the walls increase.

In the above-described IEEE802.11ad of the 60 GHz band, while the possible communication distance is as short as about 10 m, a large capacity and high-speed communication may be conducted. Although IEEE802.11ad of the 60 GHz may not pass over a blocking object due to the strong straight traveling property, the transmission and reception characteristic may be improved by adopting the directivity control by multiple antennas. As described above, since merits and demerits exist depending on the transmission methods, it is effective to switch a transmission method even during a communication.

In addition, it may be effective to switch a channel even during a communication.

The range of frequencies that may be used in a wireless communication is fixed. A frequency band to be used is divided into "channels" within the range such that multiple communication devices may conduct communications simultaneously using different channels.

In IEEE802.11b/g/n using the 2.4 GHz band, the frequency band is divided into 13 channels of 1 ch to 13 ch each having the channel width of 20 MHz.

In IEEE802.11a/n/ac using the 5 GHz band, the frequency band is divided into 19 channels of 36 ch to 64 ch and 100 ch to 140 ch each having the channel width of 20/40 MHz and 80/160 MHz.

In IEEE802.11ad using the 60 GHz band, the frequency band is divided into four channels of 1 ch to 4 ch each having the channel width of 9 GHz.

As illustrated in the example of FIG. 4A, in IEEE802.11b/g/n using the 2.4 GHz band, for example, 1 ch has the center frequency of 2,412 MHz and the band of 2,401 MHz to 2,423 MHz, 2 ch has the center frequency of 2,417 MHz and the band of 2,406 MHz to 2,428 MHz, 3 ch has the center frequency of 2,422 MHz and the band of 2,411 MHz to 2,433 MHz, 4 ch has the center frequency of 2,417 MHz and the band of 2,416 MHz to 2,438 MHz, 5 ch has the center frequency of 2,432 MHz and the band of 2,421 MHz to 2,443 MHz, 6 ch has the center frequency of 2,437 MHz and the band of 2,426 MHz to 2,448 MHz, 7 ch has the center frequency of 2,442 MHz and the band of 2,431 MHz to 2,453 MHz, 8 ch has the center frequency of 2,447 MHz and the band of 2,436 MHz to 2,458 MHz, 9 ch has the center frequency of 2,452 MHz and the band of 2,441 MHz to 2,463 MHz, 10 ch has the center frequency of 2,457 MHz and the band of 2,446 MHz to 2,468 MHz, 11 ch has the center frequency of 2,462 MHz and the band of 2,451 MHz to 2,473 MHz, 12 ch has the center frequency of 2,467 MHz and the band of 2,456 MHz to 2,478 MHz, 13 ch has the center frequency of 2,472 MHz and the band of 2,461 MHz to 2,483 MHz, 14 ch has the center frequency of 2,484 MHz and the band of 2,473 MHz to 2,495 MHz.

As described above, the frequency band of a channel overlaps with the frequency band of an adjacent channel. This is called an "overlap." Specifically, in a case of the "channel width of 20 MHz," three channels overlap with each other in the front and rear portions. In a case of the "channel width of 22 MHz," four channels overlap with each other in the front and rear portions. These channels are in the mutually interfering relationship.

That is, when one unit uses "1 ch" and another unit uses "2 ch" in a wireless communication, the channels interfere with each other. As a result, the communication may become unstable.

In a case where three (or four) channels overlap with each other, shifting the channels by the number of overlapping channels+1 avoids interference between the channels. If "1 ch, 5 ch, 9 ch, and 13 ch" are used in the case of the "channel width of 20 MHz," and "1 ch, 6 ch, 11 ch (2 ch, 7 ch, and 12 ch or 3 ch, 8 ch, and 13 ch)" are used in the case of the "channel width of 22 MHz," the communication becomes stable. Thus, the channels that may be expected to conduct a stable communication (non-overlapping channels) are the four (or three) channels.

As illustrated in the example of FIG. 4B, in IEEE802.11a/n/ac using the 5 GHz band, 19 channels are present. The frequency bands of the respective channels are independent and do not interfere with each other. That is, the interference does not occur even if an adjacent channel is allocated. Thus, if the 5 GHz band is used, not only the interference with other devices disappears but also the interference with the channels disappears.

In addition, as the switching of a channel, a "channel bonding" function (a high speed mode) may be included. That is, as the switching of a channel, added are switching of a wireless communication which does not use the channel bonding function to a wireless communication which uses the channel bonding function, switching of a wireless communication which uses the channel bonding function to a wireless communication which does not use the channel bonding function and switching between wireless communications that use the channel bonding function. The channel bonding function is a technique of using multiple (for example, two) channels simultaneously and bonding the channels to each other so as to increase the communication speed. For example, the band occupied by one channel is 20 MHz. If the bands of two channels are bonded to each other, a communication is conducted in the 40 MHz band. It should be noted that if the channel bonding function is used, the number of available channels decreases, and the interference may easily occur. Further, a master device and an associated device are required to conform to the channel bonding function.

In addition, as the switching of a transmission method, "multiple input, multiple output (MIMO)" may be included. That is, as the switching of a transmission method, added are changing of a wireless communication which does not use the MIMO to a wireless communication which uses the MIMO, changing of a wireless communication which uses the MIMO to a wireless communication which does not use the MIMO, and changing between antennas according to the MIMO The MIMO is a technique in which both a transmitter and a receiver use multiple antennas in a wireless communication so as to implement a high speed communication. In addition, a master device and an associated device are required to conform to the MIMO.

FIG. 5 is a flowchart illustrating an exemplary process by the present exemplary embodiment.

Hereinafter, in the descriptions of the flowchart, for example, a communication A indicating a transmission method is the WiGig communication, and a communication B indicating a transmission method is another Wi-Fi communication.

In step S502, it is determined whether a connection by the communication A is possible. If it is determined that the connection by the communication A is possible, the process proceeds to step S504. Otherwise (for example, if the communication A has already been used), the process proceeds to step S514.

In step S504, a communication is started by the communication A.

In step S506, it is determined whether an instruction to switch the communication A to the communication B has been made. If it is determined that the instruction has been made, the process proceeds to step S508. Otherwise, the process proceeds to step S512.

In step S508, the communication A is ended and switched to the communication B, and the communication is continued.

In step S510, it is determined whether the communication has been ended. If it is determined that the communication has been ended, the process is ended (step S599). Otherwise, the process stands by until the communication is ended.

In step S512, it is determined whether the communication has been ended. If it is determined that the communication has been ended, the process is ended (step S599). Otherwise, the process returns to step S506.

In step S514, it is determined whether a connection by the communication B is possible. If it is determined that a connection by the communication B is possible, the process proceeds to step S516. Otherwise, the process returns to step S502.

In step S516, it is determined whether the priority of a service that is conducting the communication using the communication A is low. If it is determined that the priority is low, the process proceeds to step S518. Otherwise, the process proceeds to step S526. For example, if the service that is conducting the communication using the communication A is a scanning service and if the service that is attempting to start a communication from now on is the printing service, the answer of step S516 is "Y."

In step S518, an instruction is made to switch the communication A of the service that is conducting the communication, to the communication B. The instruction in step S518 corresponds to the instruction received in step S506.

In step S520, it is determined whether a connection by the communication A is possible. If it is determined that a connection by the communication A is possible, the process proceeds to step S522. Otherwise, the process stands by until the connection becomes possible.

In step S522, a communication is started by the communication A.

In step S524, it is determined whether the communication has been ended. If it is determined that the communication has been ended, the process is ended (step S599). Otherwise, the process stands by until the communication is ended.

In step S526, a communication is started by the communication B.

In step S528, it is determined whether the communication has been ended. If it is determined that the communication has been ended, the process is ended (step S599). Otherwise, the process stands by until the communication is ended.

For example, the information processing apparatus 100 is equipped with (i) the wireless communication A module 130A having a relatively fast communication speed (the communication A in the flowchart, for example, WiGig) and (ii) the wireless communication B module 130B having a relatively slow communication speed (the communication B in the flowchart, for example, Wi-Fi slower than WiGig). The connection priority of one of the wireless communication modules 130 is set to be higher than that of the other. For example, the connection priority of the wireless communication A module 130A having a fast communication speed is set to be higher. If the communication is attempted to be started in response to a communication request made from the communication device 180B and if the wireless communication A module 130A having a fast communication speed is being used, the wireless communication A module 130A being used in communication is switched to the wireless communication B module 130B having a slow communication speed, and a communication is started by the free wireless communication A module 130A having a fast communication speed.

To determine whether to switch the wireless communication module 130 of the service that is conducting a communication, the priority of the service that is conducting the communication is compared with the priority of the service that is attempting to start a communication from now on. If the service having the higher priority than that of the service that is conducting the communication is attempting to start, the wireless communication module 130 of the service that is conducting the communication is switched.

For example, as an example of the priority, the priority of the printing service (the printing process service) is set to be higher than that of the scanning service (the image reading service).

For the printing service, the user needs to stay in the place of the image processing apparatus 200 until the printing is ended, and the printing process needs to be performed fast. Therefore, the wireless communication A module 130A having the fast communication speed is used.

For the scanning service, the image processing apparatus 200 performs follow-up communication processes after reading the original document. The user does not need to stay in the place of the image processing apparatus 200 until the communication is ended. Thus, the wireless communication B module 130B having the slow communication speed may be used.

This case is merely an example. The present exemplary embodiment is not limited thereto. The priority may be determined depending on whether or not a service requires the user to stay in front of the image processing apparatus 200 during the communication or after the end of the communication. For example, the priority of this service may be set to be higher than those of other services. An example of this service is the printing service. In addition, the priority may be determined depending on whether or not a service (an original-document reading process) requires the user to stay in front of the image processing apparatus 200 prior to the communication and allows the user to leave the image processing apparatus 200 thereafter (during the communication after the start of the communication or after the end of the communication). For example, the priority of this service may be set to be lower than those of other services. An example of this service is the scanning service.

In addition, if the scanning service also requires the user to stay in front of the image processing apparatus 200 until the service is ended, the wireless communication A module 130A having the fast communication speed may be used.

In addition, if a service allows the user to be away from the image processing apparatus 200 during the communication, WiGig having a strong directivity may not conduct the communication. In this case, it may be determined that Wi-Fi is selected rather than WiGig, even though the communication speed of Wi-Fi is slow.

Figure 6:
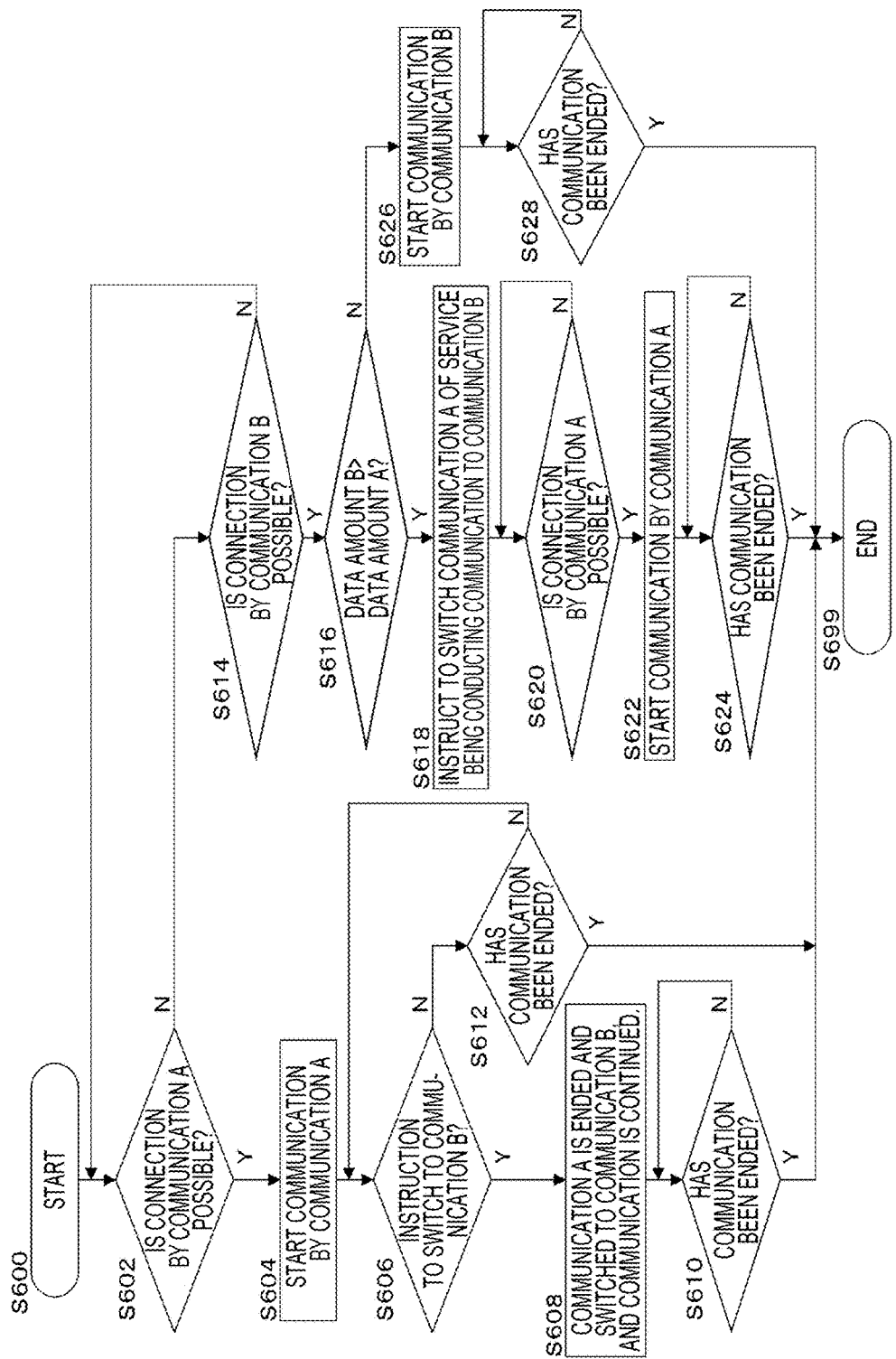
FIG. 6 is a flowchart illustrating an exemplary process by the exemplary embodiment.

FIG. 6 is a flowchart illustrating an exemplary process by the present exemplary embodiment.

In this flowchart, the "data amount A" refers to a remaining data amount of a service that is conducting a communication by the communication A. The "data amount B" refers to a data amount of a service that is attempting to start a communication from now on.

In step S602, it is determined whether a connection by the communication A is possible. If it is determined that a connection by the communication A is possible, the process proceeds to step S604. Otherwise (for example, if the communication A has already been used), the process proceeds to step S614.

In step S604, a communication is started by the communication A.

In step S606, it is determined whether an instruction to switch the communication A to the communication B has been made. If it is determined that the instruction has been made, the process proceeds to step S608. Otherwise, the process proceeds to step S612.

In step S608, the communication A is ended and switched to the communication B, and the communication is continued.

In step S610, it is determined whether the communication has been ended. If it is determined that the communication has been ended, the process is ended (step S699). Otherwise, the process stands by until the communication is ended.

In step S612, it is determined whether the communication has been ended. If it is determined that the communication has been ended, the process is ended (step S699). Otherwise, the process returns to step S606.

In step S614, it is determined whether a connection by the communication B is possible. If it is determined that a connection by the communication B is possible, the process proceeds to step S616. Otherwise, the process returns to step S602.

In step S616, it is determined whether "the data amount B>the data amount A." If it is determined that "the data amount B>the data amount A," the process proceeds to step S618. Otherwise, the process proceeds to step S626. That is, if the data amount of the service that is attempting to start a communication from now on is larger than the remaining data amount of the service that is conducting the communication, the process proceeds to the process following step S618 that performs the switching.

In step S618, an instruction is made to switch the communication A of the service that is conducting the communication, to the communication B. The instruction in step S618 corresponds to the instruction received in step S606.

In step S620, it is determined whether a connection by the communication A is possible. If it is determined that a connection by the communication A is possible, the process proceeds to step S622. Otherwise, the process stands by until the connection becomes possible.

In step S622, a communication is started by the communication A.

In step S624, it is determined whether the communication has been ended. If it is determined that the communication has been ended, the process is ended (step S699). Otherwise, the process stands by until the communication is ended.

In step S626, a communication is started by the communication B.

In step S628, it is determined whether the communication has been ended. If it is determined that the communication has been ended, the process is ended (step S699). Otherwise, the process stands by until the communication is ended.

In the information processing apparatus 100, when the service that is conducting a communication uses the wireless communication A module 130A having the fast communication speed, the remaining data amount of the service that is conducting the communication is compared with the data amount of the service that is attempting to start a communication from now on. If the data amount of the service that is attempting to start the communication from now on is larger, the wireless communication A module 130A used in the service that is conducting the communication is switched to the wireless communication B module 130B. In addition to the condition of the data amount, the switching may be performed on the condition that the priority of the service that is attempting to start the communication from now on is higher than the priority of the service that is conducting the communication.

Figure 7:
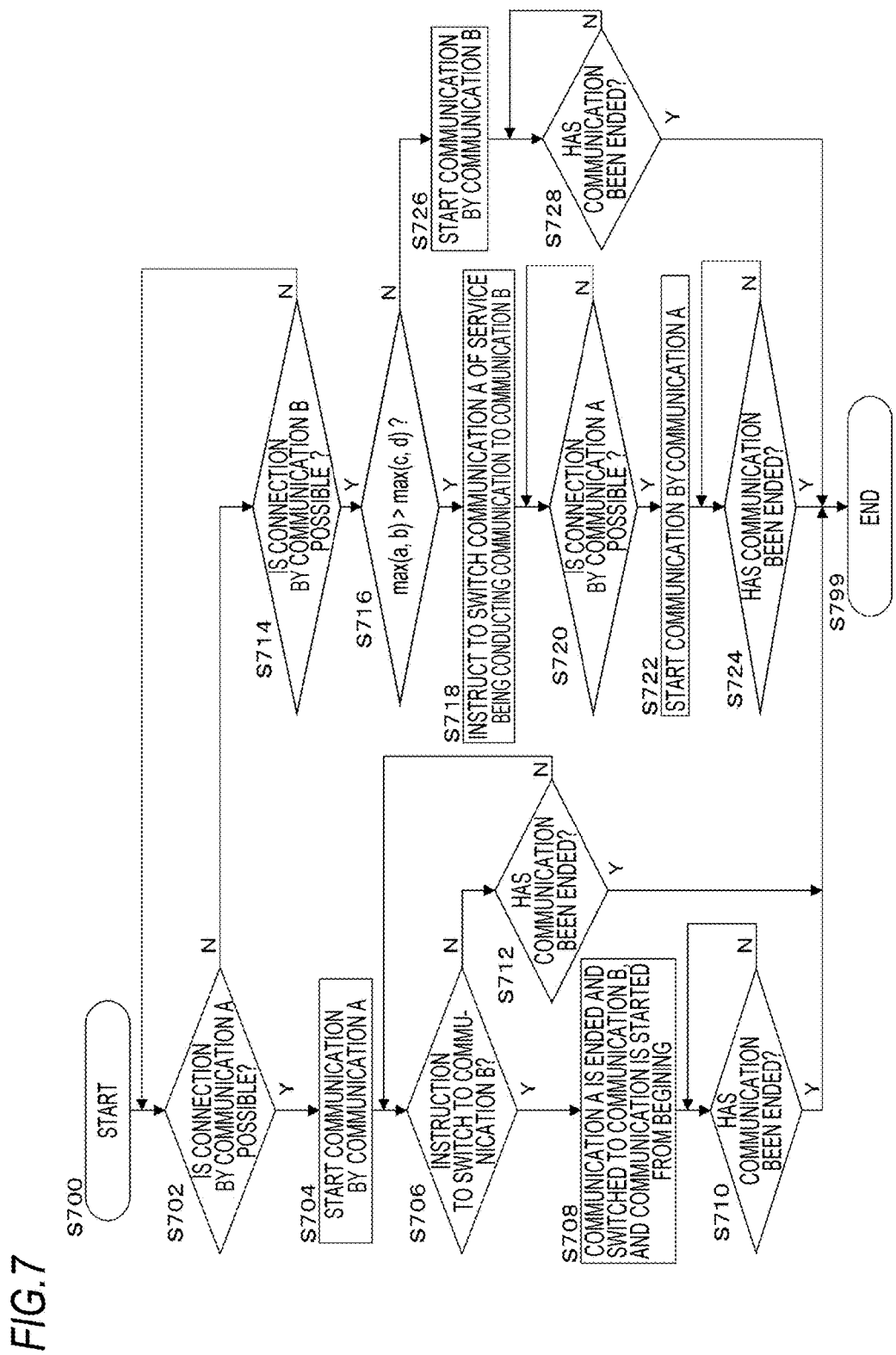
FIG. 7 is a flowchart illustrating an exemplary process by the exemplary embodiment.

FIG. 7 is a flowchart illustrating an exemplary process by the present exemplary embodiment.

In this flowchart, time "a" refers to communication time when the communication of the data amount A is continued by the communication A, time "b" refers to communication time when the communication of the data amount B is conducted by the communication B, time "c" refers to communication time when the communication of the data amount A is conducted by switching the communication A to the communication B, and time "d" refers to communication time when the communication of the data amount B is conducted by the communication A.

In step S702, it is determined whether a connection by the communication A is possible. If it is determined that a connection by the communication A is possible, the process proceeds to step S704. Otherwise (for example, when the communication A has already been used), the process proceeds to step S714.

In step S704, a communication is started with the communication A.

In step S706, it is determined whether an instruction to switch the communication A to the communication B has been made. If it is determined that the instruction has been made, the process proceeds to step S708. Otherwise, the process proceeds to step S712.

In step S708, the communication A is ended and switched to the communication B, and a communication is started from the beginning.

In step S710, it is determined whether the communication has been ended. If it is determined that the communication has been ended, the process is ended (step S799). Otherwise, the process stands by until the communication is ended.

In step S712, it is determined whether the communication has been ended. If it is determined that the communication has been ended, the process is ended (step S799). Otherwise, the process returns to step S706.

In step S714, it is determined whether a connection by the communication B is possible. If it is determined that a connection by the communication B is possible, the process proceeds to step S716. Otherwise, the process returns to step S702.

In step S716, it is determined whether "max (a, b)>max (c, d)." If it is determined that "max(a, b)>max(c, d)," the process proceeds to step S718. Otherwise, the process proceeds to step S726. That is, if the communication time in a case where the switching is not performed is longer than the communication time in a case where the switching is performed, the process proceeds to the process following step S718 that performs the switching. In this example, it is determined whether to perform the switching, by using respective maximum communication times (that is, the latest time at which the communication is ended). Alternatively, it may be determined whether to perform the switching, by using respective total communication times. That is, if "(a+b)>(c+d)," the process may proceed to step S718. Otherwise, the process may proceed to step S726.

In step S718, an instruction is made to switch the communication A of the service that is conducting the communication, to the communication B. The instruction in step S718 corresponds to the instruction received in step S706.

In step S720, it is determined whether a connection by the communication A is possible. If it is determined that a connection by the communication A is possible, the process proceeds to step S722. Otherwise, the process stands by until the connection becomes possible.

In step S722, a communication is started by the communication A.

In step S724, it is determined whether the communication has been ended. If it is determined that the communication has been ended, the process is ended (step S799). Otherwise, the process stands by until the communication is ended.

In step S726, a communication is started by the communication B.

In step S728, it is determined whether the communication has been ended. If it is determined that the communication has been ended, the process is ended (step S799). Otherwise, the process stands by until the communication is ended.

In the information processing apparatus 100, if the service that is conducting a communication uses the wireless communication A module 130A having the fast communication speed, the time taken to conduct the communication by each wireless communication module 130 is calculated based on the remaining data amount of the service that is conducting the communication, the data amount of the service that is attempting to start the communication from now on, and the communication speed of each wireless communication module 130. If it is determined that continuing the communication will end the communication in a shorter time compared to a case where the wireless communication module 130 is switched, the wireless communication module 130 is not switched. In addition, if it is determined that switching the wireless communication module 130 ends the communication in a shorter time, the wireless communication module 130 is switched. In addition to the condition of the communication time, the switching may be performed on the condition that the priority of the service that is attempting to start the communication from now on is higher than the priority of the service that is conducting the communication.

Figure 8:
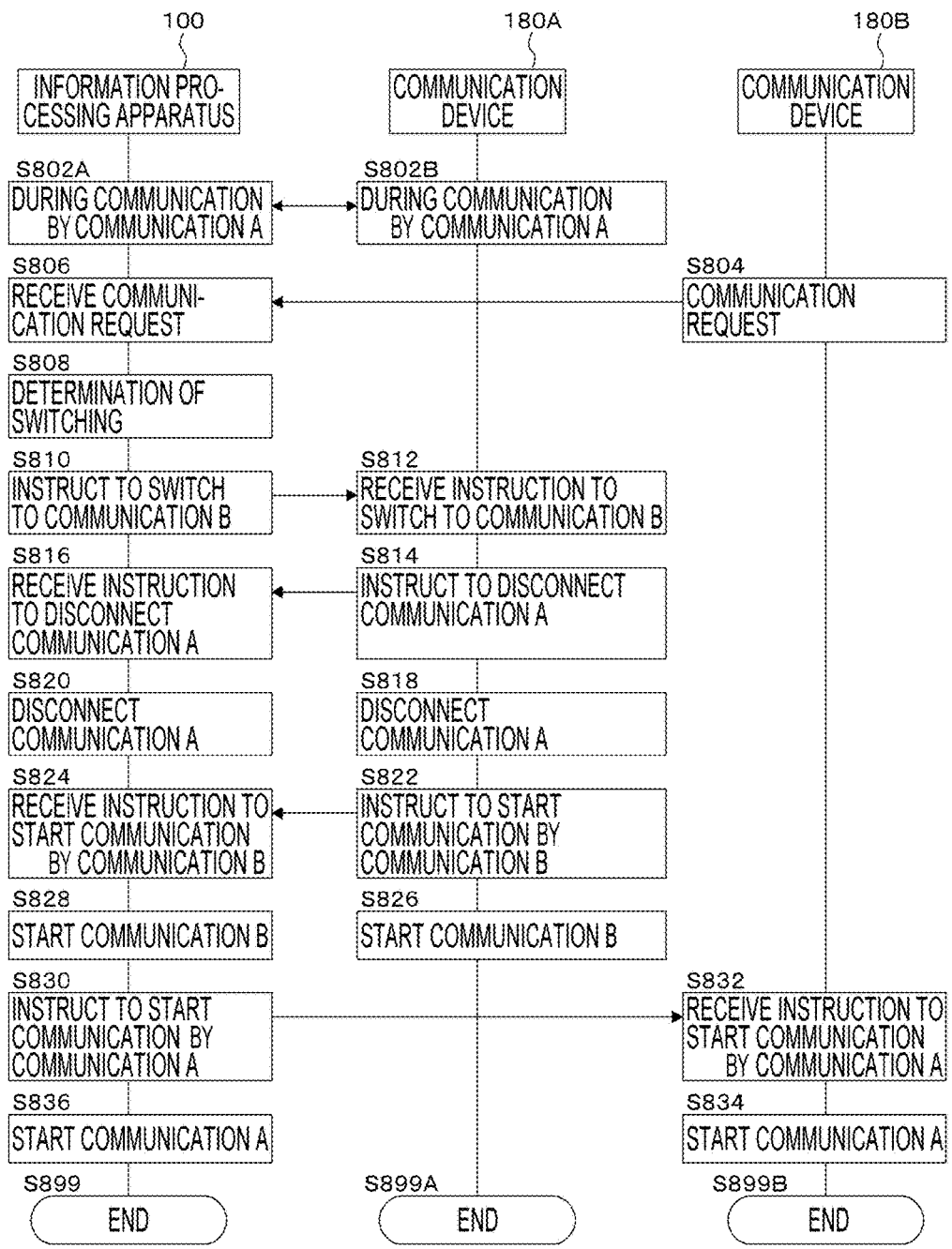
FIG. 8 is a flowchart illustrating an exemplary process by the exemplary embodiment.

FIG. 8 is a flowchart illustrating an exemplary process by the present exemplary embodiment. FIG. 8 illustrates an exemplary process in a case where the switching occurs, among the exemplary processes in the flowcharts illustrated in FIGS. 5 to 7. FIG. 8 represents an example where when the communication device 180A and the information processing apparatus 100 have already communicated with each other by the communication A having the fast communication speed (for example, the WiGig communication), a communication request is made from the communication device 180B, it is determined that the switching of the communication is necessary, the communication with the communication device 180A is switched to the communication B having the slow communication speed (for example another Wi-Fi communication), and the communication with the communication device 180B is conducted by the communication A having the fast communication speed.

In step S802A, the information processing apparatus 100 and the communication device 180A are communicating with each other by the communication A.

In step S802B, the communication device 180A and the information processing apparatus 100 are communicating with each other by the communication A.

In step S804, the communication device 180B transmits a communication request to the information processing apparatus 100.

In step S806, the information processing apparatus 100 receives the communication request from the communication device 180B.

In step S808, the information processing apparatus 100 determines to perform the switching. For example, this case corresponds to the cases where the answer in step S516 is "Y," the answer in step S616 is "Y," and the answer in step S716 is "Y."

In step S810, the information processing apparatus 100 transmits an instruction to switch the communication A to the communication B, to the communication device 180A.

In step S812, the communication device 180A receives the instruction to switch the communication A to the communication B, from the information processing apparatus 100.

In step S814, the communication device 180A transmits an instruction to disconnect the communication A, to the information processing apparatus 100.

In step S816, the information processing apparatus 100 receives the instruction to disconnect the communication A from the communication device 180A.

In step S818, the communication device 180A disconnects the communication A with the information processing apparatus 100.

In step S820, the information processing apparatus 100 disconnects the communication A with the communication device 180A.

In step S822, the communication device 180A transmits an instruction to start a communication by the communication B, to the information processing apparatus 100.

In step S824, the information processing apparatus 100 receives the instruction to start a communication by the communication B, from the communication device 180A.

In steps S814 and S822, the instructions are transmitted from the communication device 180A to the information processing apparatus 100. Alternatively, in reverse, the instructions may be transmitted from the information processing apparatus 100 to the communication device 180A.

In step S826, the communication device 180A starts the communication B with the information processing apparatus 100.

In step S828, the information processing apparatus 100 starts the communication B with the communication device 180A.

In step S830, the information processing apparatus 100 transmits an instruction to start a communication by the communication A, to the communication device 180B.

In step S832, the communication device 180B receives the instruction to start a communication by the communication A, from the information processing apparatus 100.

In step S834, the communication device 180B starts the communication A with the information processing apparatus 100.

In step S836, the information processing apparatus 100 starts the communication A with the communication device 180B.

Figure 9:
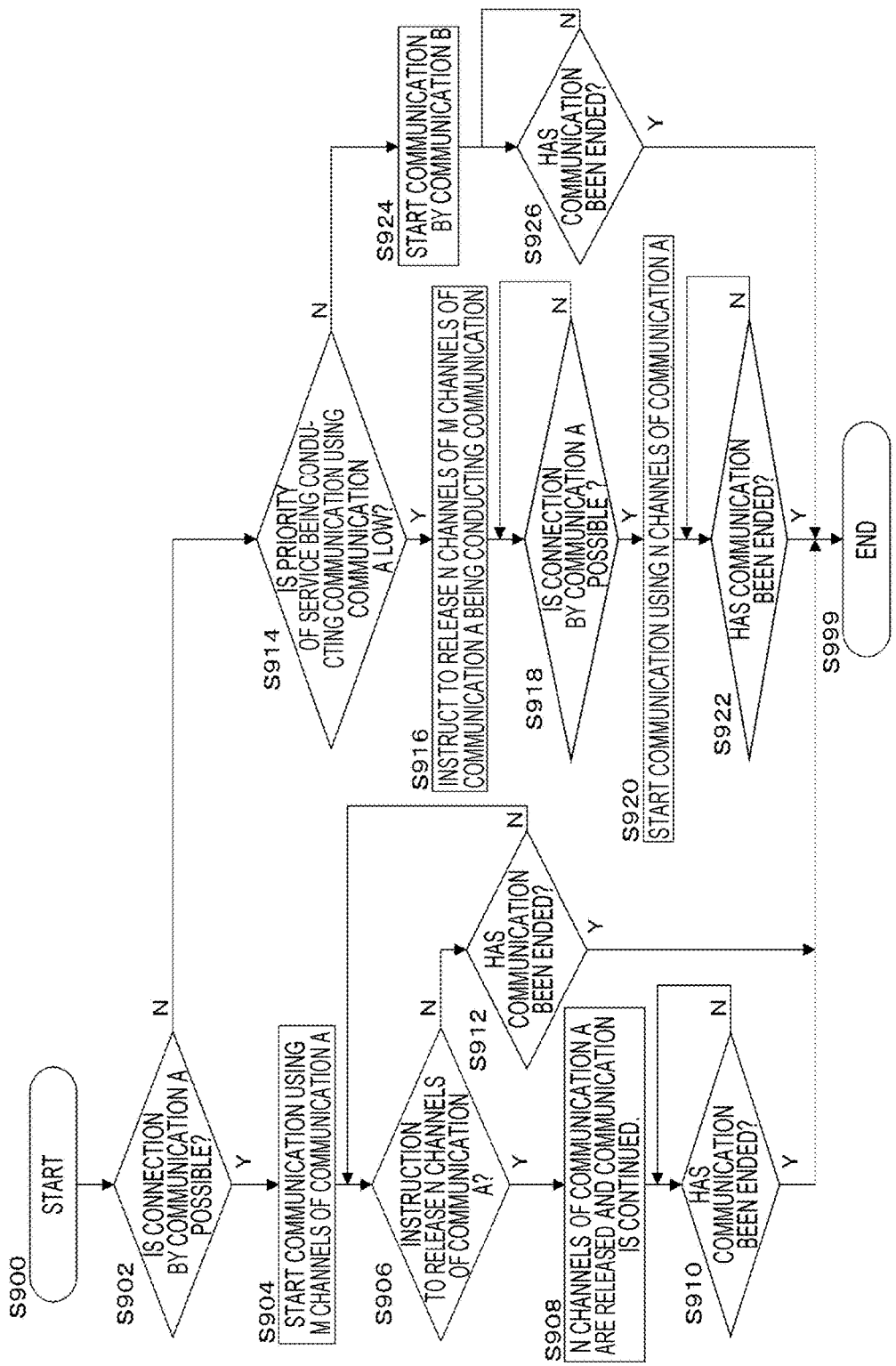
FIG. 9 is a flowchart illustrating an exemplary process by the exemplary embodiment.

FIG. 9 is a flowchart illustrating an exemplary process by the present exemplary embodiment.

In the flowchart of FIG. 9, M channels refer to the number of channels that may be used by the communication A at the same time (the number of channels used by the channel bonding). When the communication A is WiGig, the M channels are, for example, "four channels." N channels refer to the number of channels that is smaller than the M channels. N channels are, for example, "two channels." For example, when all of the four channels of the wireless communication module 130 (WiGig) having the fast communication speed are used, the four channels are reduced by two, and the two channels are allocated to the wireless communication module 130 that is attempting to newly start a communication, so as to conduct the communication.

In step S902, it is determined whether a connection by the communication A is possible. If it is determined that a connection by the communication A is possible, the process proceeds to step S904. Otherwise (for example, when the communication A has already been used), the process proceeds to step S914.

In step S904, a communication is started using the M channels of the communication A.

In step S906, it is determined whether an instruction to release the N channels in the communication A has been made. If it is determined that the instruction has been made, the process proceeds to step S908. Otherwise, the process proceeds to step S912.

In step S908, the N channels in the communication A are released, and the communication is continued.

In step S910, it is determined whether the communication has been ended. If it is determined that the communication has been ended, the process is ended (step S999). Otherwise, the process stands by until the communication is ended.

In step S912, it is determined whether the communication has been ended. If it is determined that the communication has been ended, the process is ended (step S999). Otherwise, the process returns to step S906.

In step S914, it is determined whether the priority of the service that is conducting the communication using the communication A is low. If it is determined that the priority is low, the process proceeds to step S916. Otherwise, the process proceeds to step S924. For example, if a communication has already started in the scanning service and if the printing service is attempting to start during the communication, the answer in step S914 is "Y." In addition, rather than comparing the priority of the service, a determination may be made based on a comparison between the remaining data amount of the service that is conducting the communication and the data amount of the service that is attempting to start the communication. Alternatively, a determination may be made based on a comparison between the remaining communication time of the service that is conducting the communication and the communication time of the service that is attempting to start the communication.

In step S916, an instruction is made to release the N channels of the M channels in the communication A being used in communication. The instruction in step S918 corresponds to the instruction received in step S906.

In step S918, it is determined whether a connection by the communication A is possible. If it is determined that a connection by the communication A is possible, the process proceeds to step S920. Otherwise, the process stands by until the connection becomes possible.

In step S920, a communication is started using the N channels of the communication A.

In step S922, it is determined whether the communication has been ended. If it is determined that the communication has been ended, the process is ended (step S999). Otherwise, the process stands by until the communication is ended.

In step S924, a communication is started with the communication B. In this example, the communication is conducted with the communication B. Alternatively, the communication stands by until the communication A becomes free.

In step S926, it is determined whether the communication has been ended. If it is determined that the communication has been ended, the process is ended (step S999). Otherwise, the process stands by until the communication is ended.

Figure 10:
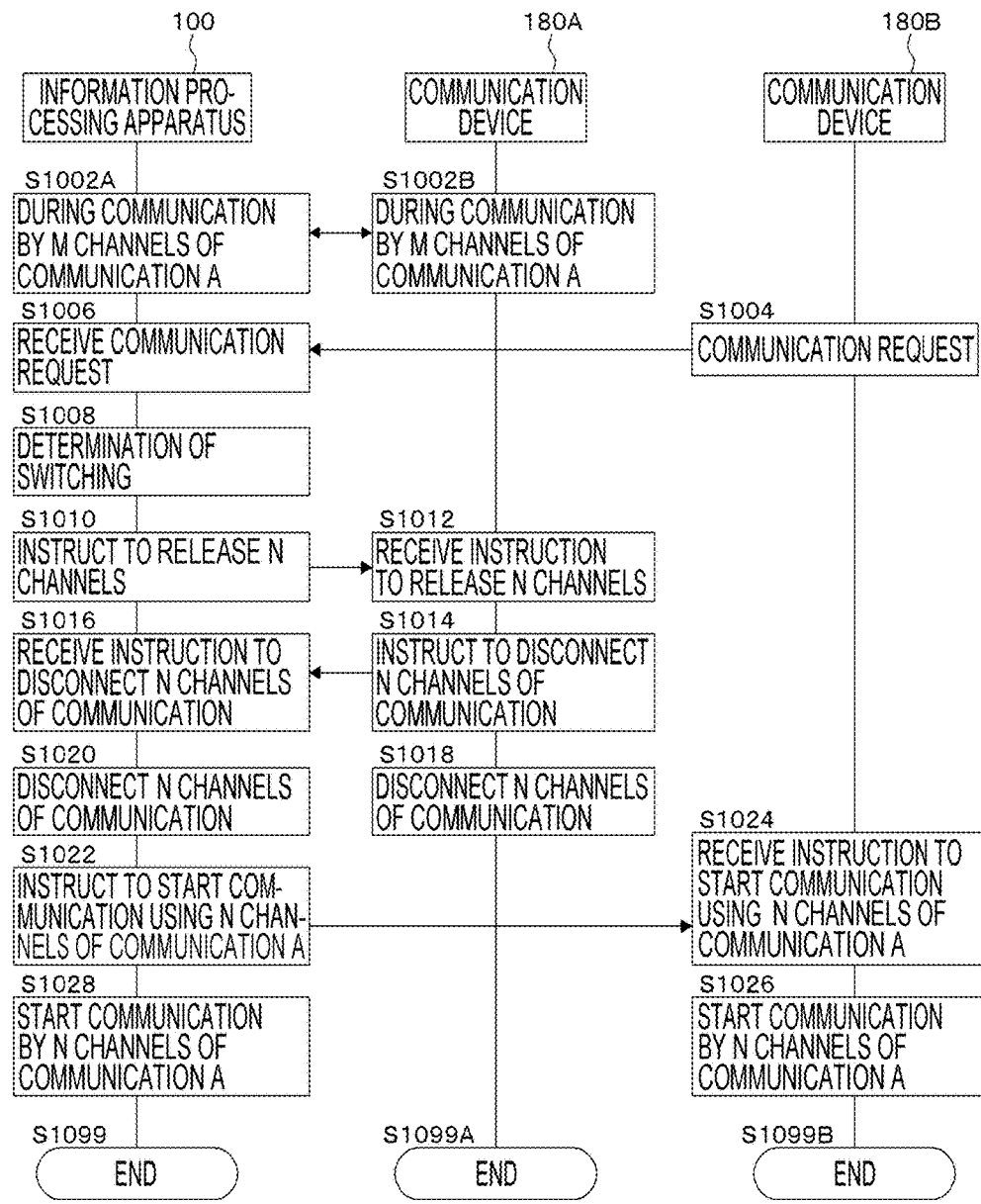
FIG. 10 is a flowchart illustrating an exemplary process by the exemplary embodiment.

FIG. 10 is a flowchart illustrating an exemplary process by the present exemplary embodiment. FIG. 10 represents an exemplary process in a case where the switching of the number of the channels occurs, in the exemplary process of the flowchart illustrated in FIG. 9. FIG. 10 represents an example where when the communication device 180A and the information processing apparatus 100 have already communicated with each other by using the M channels of the communication A having the fast communication speed (for example, the WiGig communication), a communication request is made from the communication device 180B, it is determined that the switching of the communication channels is necessary, the communication with the communication device 180A is switched to a communication by (M-N) channels, and the communication with the communication device 180B is conducted by using the N channels of the communication A.

In step S1002A, the information processing apparatus 100 and the communication device 180A are communicating with each other by using the M channels of the communication A.

In step S1002B, the communication device 180A and the information processing apparatus 100 are communicating with each other by using the M channels of the communication A.

In step S1004, the communication device 180B transmits a communication request to the information processing apparatus 100.

In step S1006, the information processing apparatus 100 receives the communication request from the communication device 180B.

In step S1008, the information processing apparatus 100 determines whether to switch the channels.

In step S1010, the information processing apparatus 100 transmits an instruction to release the N channels, to the communication device 180A.

In step S1012, the communication device 180A receives the instruction to release the N channels, from the information processing apparatus 100.

In step S1014, the communication device 180A transmits an instruction to disconnect the N channels of the communication, to the information processing apparatus 100.

It should be noted that in step S1014, the instruction is transmitted from the communication device 180A to the information processing apparatus 100. Alternatively, in reverse, the instruction may be transmitted from the information processing apparatus 100 to the communication device 180A.

In step S1016, the information processing apparatus 100 receives the instruction to disconnect the N channels of the communication, from the communication device 180A.

In step S1018, the communication device 180A disconnects the N channels of the communication with the information processing apparatus 100.

In step S1020, the information processing apparatus 100 disconnects the N channels of the communication with the communication device 180A.

In step S1022, the information processing apparatus 100 transmits an instruction to start a communication using the N channels of the communication A, to the communication device 180B.

In step S1024, the communication device 180B receives the instruction to start a communication using the N channels of the communication A, from the information processing apparatus 100.

In step S1026, the communication device 180B starts the communication with the information processing apparatus 100 by using the N channels of the communication A.

In step S1028, the information processing apparatus 100 starts the communication with the communication device 180B by using the N channels of the communication A.

Figure 11:
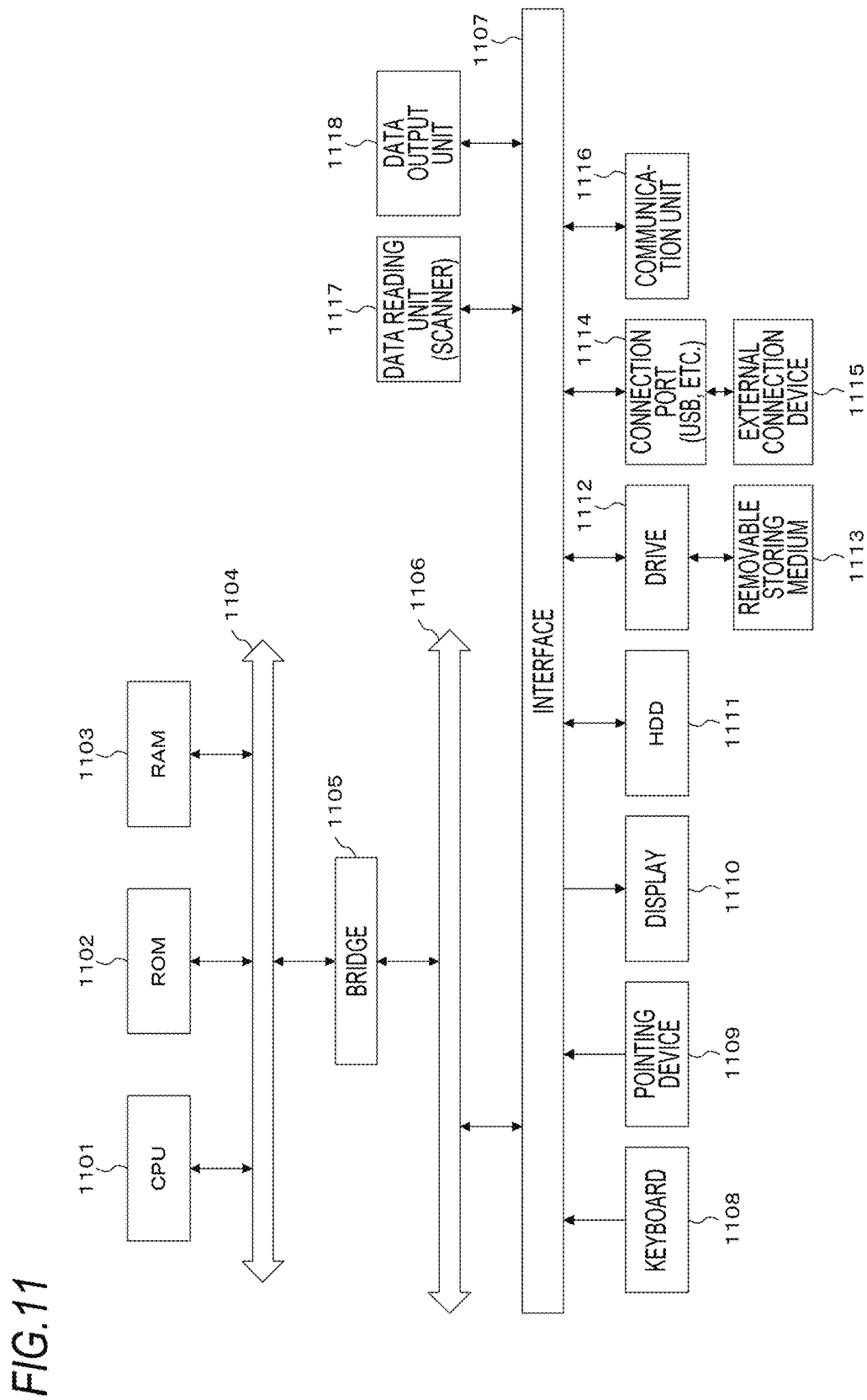
FIG. 11 is a block diagram illustrating an exemplary hardware configuration of a computer implementing the exemplary embodiment.

An exemplary hardware configuration of the information processing apparatus of the present exemplary embodiment will be described with reference to FIG. 11. The configuration illustrated in FIG. 11 is implemented by, for example, a personal computer (PC), and represents an exemplary hardware configuration provided with a data reading unit 1117 such as a scanner and a data output unit 1118 such as a printer. Further, while the example illustrated in FIG. 3 represents the configuration mainly serving as a chip using the ASIC or the like, the example illustrated in FIG. 11 mainly represents a functional configuration that is implemented by a personal computer or the like. For example, a CPU 1101 takes in charge of the functions by the SoC 300 and the ASIC 330.

The CPU 1101 is a controller that performs processes according to a computer program describing an execution sequence of each of the various modules described in the above-described exemplary embodiment, that is, the communication control module 110, the switching determination module 115, the switching module 120, the control module 125, the wireless communication A module 130A, the wireless communication B module 130B, and the like.

A read only memory (ROM) 1102 stores programs, operation parameters, and the like used by the CPU 1101. A RAM 1103 stores programs used in the execution by the CPU 1101, parameters appropriately varying in the execution, and the like. These components are connected to each other by a host bus 1104 configured with a CPU bus or the like.

The host bus 1104 is connected to an external bus 1106 such as a peripheral component interconnect/interface (PCI) bus via a bridge 1105.

A keyboard 1108 and a pointing device 1109 such as a mouse are devices operated by an operator. A display 1110 is, for example, a liquid crystal display device or a cathode ray tube (CRT), and displays various types of information as texts and image information. In addition, a touch screen or the like having the functions of both the pointing device 1109 and the display 1110 may be used. In this case, the function of the keyboard may be implemented by drawing the keyboard using software (also called a so-called software keyboard, screen keyboard or the like) on the screen (the touch screen), without the physical connection like the keyboard 1108.

A hard disk drive (HDD) 1111 is equipped with a hard disk (which may be a flash memory or the like) therein, drives the hard disk, and stores or plays programs or information executed by the CPU 1101. In the hard disk, predetermined priorities of services, communication contents, and the like are stored. Further, in the hard disk, other various data and various computer programs are stored.

A drive 1112 reads data and programs stored in a removable storage medium 1113 such as a mounted magnetic disk, optical disc, magneto-optical disc, or semiconductor memory, and supplies the data or programs to the interface 1107, the external bus 1106, the bridge 1105, and the RAM 1103 connected via the host bus 1104. In addition, the removable storage medium 1113 may also be used as a data storage area.

A connection port 1114 is a port for connection of an external connection device 1115, and includes connection units such as USB and IEEE 1394. The connection port 1114 is connected to the CPU 1101 and the like via the interface 1107, the external bus 1106, the bridge 1105, the host bus 1104, and the like. A communication unit 1116 is connected to a communication line and performs a process of a data communication with an external device. The data reading unit 1117 is, for example, a scanner and performs a document reading process. The data output unit 1118 is, for example, a printer, and performs a document data outputting process.

The hardware configuration of the information processing apparatus illustrated in FIG. 11 represents an exemplary configuration. The present exemplary embodiment is not limited to the configuration illustrated in FIG. 11, and may be any configuration that may execute the modules described in the present exemplary embodiment. For example, some of the modules may be configured with dedicated hardware (for example, application specific integrated circuit (ASIC)), and some of the modules may be in the form in which the modules are present in an external system and connected via a communication line. Further, the multiple systems illustrated in FIG. 11 may be connected to each other via a communication line and cooperate with each other. In addition, the multiple systems of FIG. 11 may be incorporated in a portable information communication device, an information appliance, a robot, a copier, a facsimile, a scanner, a printer, a multifunctional machine, and the like, in addition to a personal computer.

In the comparing process described in the above-described exemplary embodiment, the expressions "equal to or more than," "equal to or less than," "larger than," and "smaller than (not exceeding)" may be replaced with "larger than," "smaller than (not exceeding)," "equal to or more than," and "equal to or less than," respectively unless the replacement causes contradiction.

In addition, the communication may be controlled by calculating (a) the time taken until a communication of a service that is conducting a communication is ended and (b) the time until a service that is attempting to start a communication from now on is ended (pattern 1) or (c) the time taken when the communication of the service that is conducting the communication is stopped and the wireless communication module 130 is switched to start a communication from the beginning and (d) the time taken when the service that is attempting to start the communication from now on is switched and the communication is conducted by the free wireless communication module 130 (pattern 2), and selecting one of the patterns by which the communication is ended in shorter time.

In addition, when the wireless communication module 130 is switched during a communication and remaining data is transmitted/received, the receiving side needs to perform a control to combine the previously received data and the data received after the switching of the wireless communication module 130. However, when the wireless communication module 130 is switched and data is transmitted again from the beginning, the control to combine the received data is unnecessary.

In addition, the communication device 180 may include the information processing apparatus 100. For example, an image processing apparatus having no information processing apparatus 100 and the communication device 180 having the information processing apparatus 100 may communicate with each other. Alternatively, the image processing apparatus 200 having the information processing apparatus 100 and the communication device 180 having the information processing apparatus 100 may communicate with each other.

The above-described programs may be provided in the form of being stored in a storage medium or provided by a communication unit. In this case, for example, the above-described programs may be construed as an invention of a "computer readable storage medium storing a program."

The "computer readable storage medium storing a program" refers to a computer readable storage medium storing a program, which is used for installation, execution, distribution, and the like of a program.

The storage medium includes, for example, a digital versatile disc (DVD) such as "DVD-R, DVD-RW, DVD-RAM or the like" which is the standard formulated in the DVD forum, "DVD+R, DVD+RW or the like" which is the standard formulated in DVD+RW, a compact disc (CD) such as a CD read only memory (CD-ROM), a CD recordable (CD-R), or a CD rewritable (CD-RW), a Blu-ray disc (Blu-ray (registered trademark) disc), a magneto-optical (MO) disc, a flexible disk (FD), a magnetic tape, a hard disk, a ROM, an electrically erasable and rewritable read only memory (EEPROM (registered trademark)), a flash memory, a random access memory (RAM), and a secure digital (SD) memory card.

All or some of the above-described programs may be stored in the storage medium so as to be saved or distributed. Further, the programs may be transmitted using a transmission medium such as a wired network used in a local area network (LAN), a metropolitan area network (MAN), a wide area network (WAN), the Internet, the Intranet, the Extranet, and the like, a wireless communication network, or a combination thereof, or may be carried on carrier waves.

In addition, the above-described programs may be all or parts of other programs, or may be stored together with separate programs in the storage medium. In addition, the above-described programs may be distributed and stored in multiple storing media. In addition, the above-described programs may be stored in a compressed or encrypted form as long as the programs may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a plurality of communication units configured to conduct a wireless communication;
a switching unit configured to switch a first communication unit having a relatively fast communication speed to a second communication unit having a relatively slow communication speed if a communication is attempted to be started and if the first communication unit is being used; and
a controller configured to perform a control to start the communication by the first communication unit.

2. The information processing apparatus according to claim 1, wherein the switching unit performs the switching by comparing a priority of a service that is conducting a communication with a priority of a service that is attempting to start the communication.

3. The information processing apparatus according to claim 2, wherein
a priority of a printing process service is higher than a priority of an image reading service, and
if the priority of the service that is attempting to start the communication is higher than the priority of the service that is conducting the communication, the switching unit performs the switching.

4. The information processing apparatus according to claim 1, wherein the switching unit performs the switching by comparing a remaining data amount or remaining communication time of a service that is conducting a communication with a data amount or communication time of a service that is attempting to start the communication.

5. The information processing apparatus according to claim 1, wherein
the first or second communication units includes a plurality of channels, and
if a service that is conducting the communication uses the plurality of channels, the switching unit performs the switching by reducing a number of channels that the service being conducting the communication uses and allocating the reduced channels to a service that is attempting to start the communication.

6. An information processing method comprising:
switching a first communication unit configured to conduct a wireless communication at a relatively fast communication speed to a second communication unit configured to conduct a wireless communication at a relatively slow communication speed if a communication is attempted to start and if the first communication unit is being used; and
performing a control to start the communication by the first communication unit.

7. A non-transitory computer readable storage medium storing a program that causes a processor to execute information processing, the information processing comprising:
switching a first communication unit configured to conduct a wireless communication at a relatively fast communication speed to a second communication unit configured to conduct a wireless communication at a relatively slow communication speed if a communication is attempted to start and if the first communication unit is being used; and
performing a control to start the communication by the first communication unit.

* * * * *